US012626194B2

(12) United States Patent (10) Patent No.: US 12,626,194 B2
Ruiz et al. (45) Date of Patent: May 12, 2026

(54) SCALABLE TRANSFER LEARNING WITH EXPERT MODELS

(71) Applicant: Google LLC, Mountain View, CA (US)

(72) Inventors: Carlos Riquelme Ruiz, Zurich (CH); André Susano Pinto, Zurich (CH); Joan Puigcerver, Zurich (CH); Basil Mustafa, Zurich (CH); Neil Matthew Tinmouth Houlsby, Zurich (CH); Sylvain Gelly, Kilchberg (CH); Cedric Benjamin Renggli, Uster (CH); Daniel Martin Keysers, Stallikon (CH)

(73) Assignee: GOOGLE LLC, Mountain View, CA (US)

( * ) Notice: Subject to any disclaimer, the term of this patent is extended or adjusted under 35 U.S.C. 154(b) by 698 days.

(21) Appl. No.: 18/008,293

(22) PCT Filed: Jun. 7, 2021

(86) PCT No.: PCT/US2021/036197
§ 371 (c)(1),
(2) Date: Dec. 5, 2022

(87) PCT Pub. No.: WO2021/248125
PCT Pub. Date: Dec. 9, 2021

(65) Prior Publication Data
US 2023/0196211 A1 Jun. 22, 2023

Related U.S. Application Data

(60) Provisional application No. 63/035,341, filed on Jun. 5, 2020.

(51) Int. Cl.
*G06N 20/20* (2019.01)

(52) U.S. Cl.
CPC .................................... *G06N 20/20* (2019.01)

(58) Field of Classification Search
CPC ...................................................... G06N 20/20
See application file for complete search history.

(56) References Cited

U.S. PATENT DOCUMENTS

2019/0354850 A1 11/2019 Watson et al.
2020/0125955 A1 4/2020 Klinger et al.
(Continued)

FOREIGN PATENT DOCUMENTS

CN 109657802 4/2019

OTHER PUBLICATIONS

Bolya et al., "Scalable diverse models selection for accessible transfer learning", 35th conference on neural information processing systems (NeurIPS 2021), 2021 (Year: 2021).*
(Continued)

*Primary Examiner* — Tsu-Chang Lee
(74) *Attorney, Agent, or Firm* — DORITY & MANNING, P.A.

(57) ABSTRACT

Generally, the present disclosure is directed to systems and methods that provide a simple, scalable, yet effective strategy to perform transfer learning with a mixture of experts (MoE). In particular, the transfer of pre-trained representations can improve sample efficiency and reduce computational requirements for new tasks. However, representations used for transfer are usually generic, and are not tailored to a particular distribution of downstream tasks. In contrast, example systems and methods of the present disclosure use expert representations for transfer with a simple, yet effective, strategy.

20 Claims, 5 Drawing Sheets

(56) References Cited

U.S. PATENT DOCUMENTS

| | | | |
|---|---|---|---|
| 2020/0401851 A1 * | 12/2020 | Mau | G06V 10/776 |
| 2021/0241231 A1 * | 8/2021 | Mullins | G06Q 10/063118 |
| 2022/0101127 A1 * | 3/2022 | Torras | G06F 18/2163 |
| 2025/0021799 A1 | 1/2025 | Shazeer et al. | |

OTHER PUBLICATIONS

Lee et al., "CleanNet: Transfer learning for scalable image classifier training with label noise", CVPR2018, 2018 (Year: 2018).*
International Preliminary Report on Patentability for Application No. PCT/US2021/036197, mailed Dec. 15, 2022, 10 pages.
International Search Report for Application No. PCT/US2021/036197, mailed Oct. 20, 2021, 3 pages.
Puigcerver, et al. "Scalable Transfer Learning with Expert Models." arXiv:2009.13239v1. Sep. 28, 2020. 28 pages.
Sharma, et al. "Long-Tailed Recognition Using Class-Balanced Experts." arXiv:2004.03706v1. Apr. 7, 2020. 18 pages.
Chinese Search Report Corresponding to Application No. 2021800404696 on Nov. 25, 2025.

* cited by examiner

SCALABLE TRANSFER LEARNING WITH EXPERT MODELS

RELATED APPLICATIONS

This application is based upon and claims the right of priority under 35 U.S.C. § 371 to International Application No. PCT/US2021/036197 filed on Jun. 7, 2021, which claims priority to U.S. Provisional Patent Application No. 63/035,341, filed Jun. 5, 2020. Each of the applications identified above which is hereby incorporated by reference in its entirety.

FIELD

The present disclosure relates generally to machine learning. More particularly, the present disclosure relates to transfer learning using a mixture of experts.

BACKGROUND

Deep learning has been successful on many computer vision tasks. Unfortunately, this success often requires a large amount of per-task data and compute. To scale deep learning to new vision tasks, practitioners often turn to transfer learning. Transfer learning involves re-using models trained on a large source task and tuning them on the target task. This can improve both convergence rates and empirical performance. Transfer learning reduces per-task data or compute requirements, given a large one-off pre-training cost. In practice, this one-off down payment may not be made by the practitioner since pre-trained networks are made available through online platforms.

Transfer of specialist models has been studied before. However, previous approaches are limited in their scalability and task diversity. They either require expensive re-training on the source dataset for every target task or operate at a small scale where all experts can be applied simultaneously. Further, most of them are tested only on a limited suite of natural single-object classification tasks.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to perform transfer learning from expert models. The method can include accessing, by a computing system comprising one or more computing devices, a plurality of expert machine-learned models, wherein the plurality of expert machine-learned models have been respectively trained on a plurality of different training datasets. The method can include obtaining, by the computing system, data descriptive of a downstream task associated with a downstream training dataset. The method can include evaluating, by the computing system, a respective performance metric for each of the plurality of expert machine-learned models relative to the downstream task. The method can include selecting, by the computing system, one or more of the plurality of expert machine-learned models to serve as one or more selected machine-learned models based at least in part on the respective performance metrics for the plurality of expert machine-learned models. The method can include fine-tuning, by the computing system, the one or more selected machine-learned models using the downstream training dataset. The method can include, after fine-tuning the one or more selected machine-learned models, providing, by the computing system, the one or more selected machine-learned models for performance of the downstream task.

In some implementations, the plurality of expert machine-learned models comprise a plurality of variants of a baseline machine-learned model that was trained on a base training dataset.

In some implementations, wherein the plurality of different training datasets on which the plurality of expert machine-learned models have been respectively trained comprise a plurality of different subportions of the base training dataset. The subportions may be overlapping or not overlapping.

In some implementations, training labels in the base training dataset are organized according to a hierarchy. In some implementations, the plurality of different subportions of the base training dataset comprise a plurality of different hierarchically-defined divisions of the base training dataset.

In some implementations, the plurality of expert machine-learned models are respectively generated by fully fine-tuning the baseline machine-learned model In some implementations, the plurality of expert machine-learned models are respectively generated by addition of one or more respective expert adapter submodels to one or more existing layers of the baseline machine-learned model.

In some implementations, each expert machine-learned model comprises one or more residual skip connections respectively around the one or more expert adapter submodels.

In some implementations, during training of each expert machine-learned model on its respective training dataset, the one or more respective expert adapter submodels are learned while the one or more existing layers of the baseline machine-learned model are held fixed.

In some implementations, during fine-tuning of the one or more selected machine-learned models using the downstream training dataset, both the one or more respective expert adapter submodels and the one or more existing layers of the baseline machine-learned model are learned.

In some implementations, selecting, by the computing system, one or more of the plurality of expert machine-learned models to serve as one or more selected machine-learned models based at least in part on the respective performance metrics for the plurality of expert machine-learned models comprises employing, by the computing system, an expert prediction network to select the one or more selected machine-learned models from the plurality of expert machine-learned models based on one or more training inputs included in the downstream training dataset.

In some implementations, selecting, by the computing system, one or more of the plurality of expert machine-learned models to serve as one or more selected machine-learned models based at least in part on the respective performance metrics for the plurality of expert machine-learned models comprises: using, by the computing system, a generic network to predict labels for one or more training examples included in the downstream training dataset; evaluating, by the computing system, a respective KL-divergence between a distribution of the labels generated by the generic network and a per-expert prior on labels generated by each expert machine-learned model during training of such expert machine-learned model; and/or selecting, by the computing system, the one or more of the plurality of expert machine-learned models to serve as the one or more selected machine-learned models based at least in part on the respective KL-divergence for each of the plurality of expert machine-learned models.

In some implementations, selecting, by the computing system, one or more of the plurality of expert machine-learned models to serve as one or more selected machine-learned models based at least in part on the respective performance metrics for the plurality of expert machine-learned models comprises: using, by the computing system, each expert machine-learned model to produce a respective input embedding for a training input included in the downstream training dataset; evaluating, by the computing system, a performance proxy for each expert machine-learned model based on application of nearest neighbors to the respective input embedding; and/or selecting, by the computing system, the one or more of the plurality of expert machine-learned models to serve as the one or more selected machine-learned models based at least in part on the respective performance proxy for each of the plurality of expert machine-learned models.

In some implementations, accessing, by the computing system, the plurality of expert machine-learned models comprises generating and training, by the computing system, the plurality of expert machine-learned models.

In some implementations, the downstream task comprises an image recognition task.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
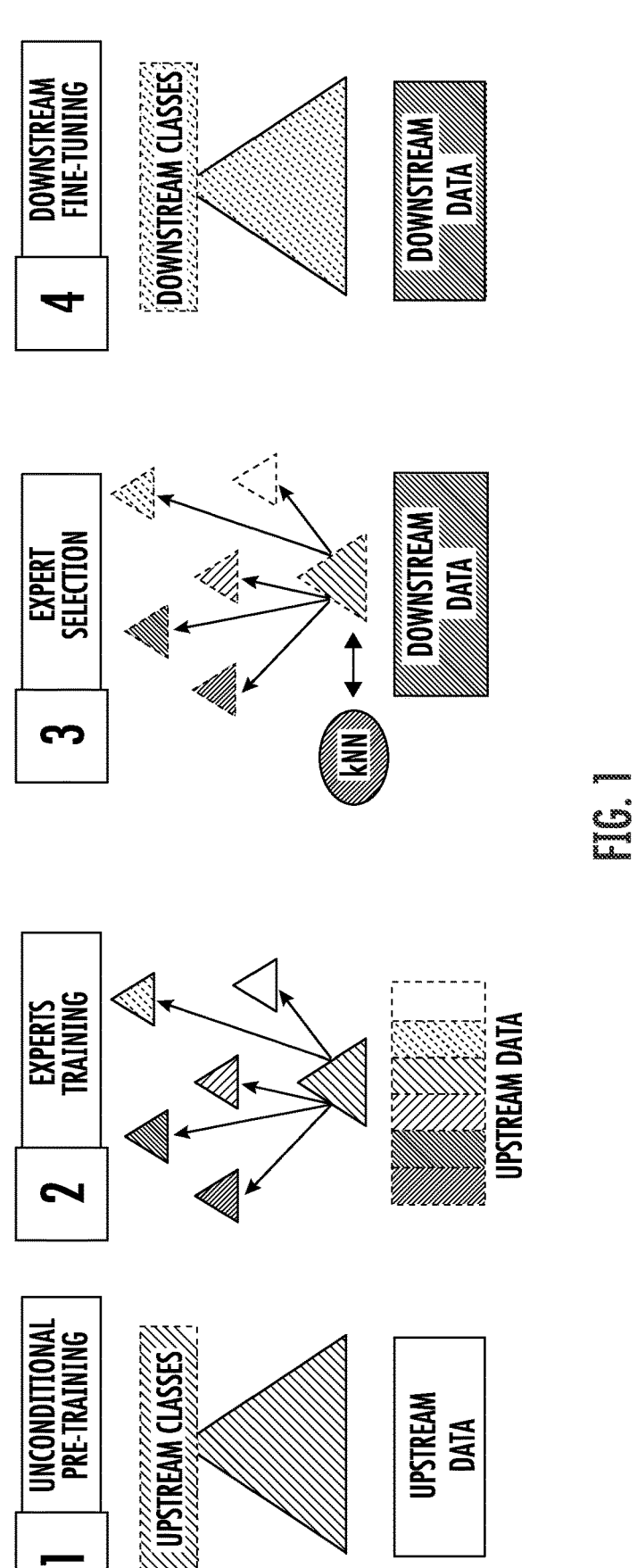
FIG. 1 depicts a block diagram of an example transfer learning process according to example embodiments of the present disclosure.

Reference numerals that are repeated across plural figures are intended to identify the same features in various implementations.

DETAILED DESCRIPTION

Overview

Generally, the present disclosure is directed to systems and methods that provide a simple, scalable, yet effective strategy to perform transfer learning with a mixture of experts (MoE). In particular, the transfer of pre-trained representations can improve sample efficiency and reduce computational requirements for new tasks. However, representations used for transfer are usually generic, and are not tailored to a particular distribution of downstream tasks. In contrast, example systems and methods of the present disclosure use expert representations for transfer with a simple, yet effective, strategy. Specifically, some example implementations train a diverse set of experts (e.g., by exploiting existing label structures in training data) and use cheap-to-compute performance proxies to select the relevant expert for each target task. For example, the mixture of experts can include multiple heterogeneous model variants ("experts") that specialize to subproblems of a full upstream task. The proposed strategy is scalable, since it does not revisit the pre-training data during transfer, requiring only a little extra compute per target task. Further, the present disclosure provides an adapter-based architecture able to compress many experts into a single model. Example experiments contained in U.S. Provisional Patent Application No. 63/035,341 evaluate example implementations of the proposed approach on two different data sources and demonstrate that it outperforms baselines on over 20 diverse vision tasks in both cases.

More particularly, as illustrated in FIG. 1, some example implementations of the proposed strategy include four stages. (1) Unconditional pre-training. A single baseline model can be trained on the entire upstream data. (2) Experts training. Multiple experts can be pre-trained by, e.g., exploiting the label hierarchy present in many large-scale image datasets, such as ImageNet and JFT. Some example implementations pre-train entire expert network. Other example implementations generate and train residual adapters that allow all of the expertise to be packed into a single model that can be loaded into memory. These two stages may be expensive, but are done only once. (3) Expert selection. Applying all experts to each task does not scale well; typically some sort of sparsification is required. Some example implementations employ an inexpensive model selection process that can be applied to hundreds or thousands of experts. (4) Downstream fine-tuning. The output of the model selection phase can be tuned on the target task. Importantly, this phase does not require revisiting the source dataset, which may be unavailable or expensive to train on. This approach yields remarkably strong performance on many diverse tasks.

Figures 2A, 2B:
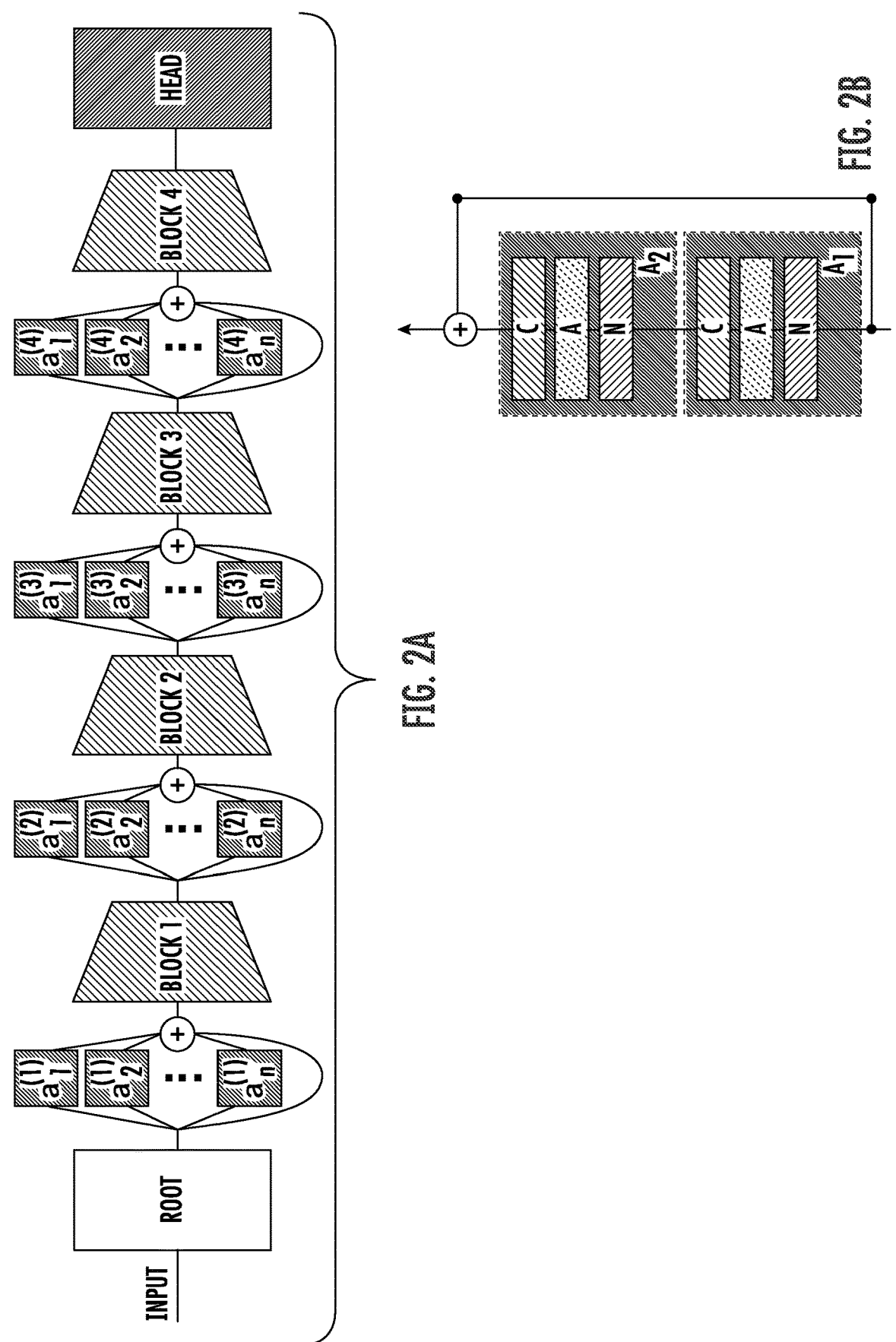
FIG. 2A depicts a block diagram of an example combined expert model according to example embodiments of the present disclosure.
FIG. 2B depicts a block diagram of an example adapter submodel according to example embodiments of the present disclosure.

Another example aspect of the present disclosure is directed to systems and methods that use sub-networks as experts via residual adapters, allowing all experts to be packed into a single model. Surprisingly, these perform almost as well as their full-network counterparts. As one example, FIG. 2A illustrates an example ResNet with expert adapters before all blocks. In the illustrated example, a layer of experts is placed before every block. Expert-specific routings through the expert adapters can be pre-defined or learned for each expert model. As shown in FIG. 2B, one example architecture for each individual adapter includes the overall skip connection. N, A, C stand for (Group) Normalization, (ReLU) Activation, and Convolution layers, respectively.

The systems and methods of the present disclosure provide a number of technical effects and benefits. As one example, by enabling improved transfer learning with expert models, the proposed approaches can reduce computational resource consumption, e.g., as compared to training a new model completely from scratch. As another example, example implementations of the proposed leverage lightweight and computationally inexpensive model selection techniques. These techniques render the proposed approach much more scalable to large numbers of experts and is in contrast to certain existing approaches which require revisiting the source dataset, which may be unavailable or expensive to train on. As another example technical effect, the resulting final models can show improved performance (e.g., accuracy) on the ultimate downstream task, which corresponds to an improvement in the functionality of a computer itself. As another example technical effect, the present disclosure provides an adapter-based architecture that is able to compress many experts into a single model. This novel approach and architecture enables the multiple experts to be trained more efficiently because they can share, in some implementations, some existing parameters of a baseline model which are not re-trained for each particular expert, thereby reducing training time and computational requirements (e.g., process usage, memory usage, network bandwidth, etc.). Likewise, when the multiple experts are combined in the single model, the single model requires fewer resources to store and handle, e.g., as compared to storing many distinct expert models.

The systems and methods of the present disclosure are applicable to a number of use cases, domains, or applications. In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

Example Transfer Learning Framework

This section describes an example transfer learning setup of interest. The high-level goal is to train strong models for arbitrary downstream tasks, possibly under severe data and compute limitations. To do so efficiently, one can offload computation to a previous upstream phase which is executed a priori, without knowing the downstream tasks in advance. Accordingly, the upstream model should not depend on any specific target data. Example implementations of the present disclosure are applicable in the low data regime where downstream tasks contain few datapoints. These restrictions have a practical motivation: example implementations of the present disclosure can deploy universal representations that are easily transferred to a wide range of downstream settings.

Example transfer algorithms can implement the following three stages.

Upstream Training. Given the upstream data $D_U$, the algorithm first outputs a source model M. The goal is to provide useful initial representations for various new tasks. This stage could actually produce a family of models $\{M_e\}$ rather than a single one. These models might not be disjoint, and could share parameters. The upstream learning problems are auxiliary; accordingly, $D_U$ could include a diverse set of classification, regression, or even synthetic learning instances.

Model Selection. When a new downstream task is given, a selection algorithm is applied to choose the upstream model(s) to transfer, possibly depending on the downstream data. This phase should be computationally cheap; thus, the upstream data is no longer available. Sometimes, there is no choice to make (say, with a single ImageNet representation). Alternatively, in models with a complex structure, one may choose which parts, routes, or modules to keep in a data-dependent fashion.

Downstream Training. The final stage fine-tunes the selected model using the downstream data, either fully or partially. For neural nets, a new head is added as the output classes are task-specific.

Example Techniques for Upstream Training

This section introduces two example architectures that can be used for the expert models.

Example Expert Architectures

Example experts usable in the context of the present disclosure can provide feature extractions that are a good starting point to learn future tasks related to the expert's upstream training data. Two examples of model architectures to train such experts are as follows. One example is Residual Networks, or ResNets. These are powerful models; however, storing and deploying many of them can be challenging. As an alternative, another example is a more compact adapter model proposed by the present disclosure that can all be assembled in a single architecture. Also, their individual size can be easily customized to meet memory and computational constraints, which makes them an ideal candidate for combining multiple experts in a single model, when needed. This disclosure informally refers to these as full and adapter modules or experts, respectively.

Full ResNet Modules. One example base architecture for full experts is ResNets., such as the ResNet50-v2 architecture (R50), which sequentially stacks a root block and 4 blocks with (3, 4, 6, 3) residual units. One initial step can include training a baseline model B on the whole upstream data. This baseline can be subsequently fine-tuned by both full and adapter experts, but in different ways. A full expert trained on a slice of data is simply the baseline B fine-tuned on that data. The head will later be discarded for transfer. This approach requires as many R50s as there are experts.

Adapter Modules. Residual adapters were proposed to adapt a neural network to a particular downstream task without needing to fine-tune the entire network. Originally, they were $1\times1$ convolutional layers that are placed after each $3\times3$ convolution, with a residual connection. Instead, example implementations of the present disclosure use them to adapt the baseline architecture to slices of the upstream data. Also, example implementations of the present disclosure do not place them after each $3\times3$ convolution, but before each of the R50's blocks. Finally, example proposed adapters have a bottleneck and are non-linear. Example implementations of the present disclosure insert several in parallel into the backbone B. In some implementations, when creating an expert, only the adapters are tuned and the backbone weights are frozen.

FIG. 2A depicts an example ResNet architecture with multiple expert adapters $$(a_1^{(i)}, \dots, a_n^{(i)}).$$

Let $F_i$ be the function implemented by the i-th block of the backbone network. Example implementations of the present disclosure adapt its input by computing the output as $$x_i F_i(x_{i-1} + a_e^{(i)}(x_{i-1})),$$

where $e = R(x)$ is the identity of the selected expert, given by some routing function R, and x is the original input. During upstream training, the function R may also use the labels in addition to the image, as we discuss in subsec: expert_training.

FIG. 2B shows an example adapter's bottleneck architecture. An example adapter sequentially applies components $A_1$ and $A_2$. Each component performs a group normalization (N), a ReLU activation (A), and a convolution (C), in that order. Due to the skip connection, the output dimension of $A_2 \circ A_1$ must match that of its input, c. However, example implementations of the present disclosure can change the output channels k of $A_1$, in order to limit the amount of parameters. Thus, example implementations of the present disclosure set $$k = \frac{c}{2}$$

so that the number of parameters equals that of a linear adapter. Each adapter only increases the parameter count of the R50 backbone by 6%.

Example Upstream Data and Expert Definition

Example implementations of the present disclosure train upstream models on large vision datasets with thousands of classes. Moreover, the datasets include an expressive hierarchy, linking classes and ancestor concepts via "is-a" relationships. Experts' domains can be nodes in this hierarchy, which are selected automatically based on the number of images. Due to the multi-label nature of the datasets, several experts could simultaneously apply to an image. For example, for an image of a lion, all of organism, animal, carnivore, felidae, and lion could be relevant expert domains. In particular, example implementations of the present disclosure use two different upstream image datasets, and independently train a set of experts on each.

Example Expert Training

Recall that B can denote the baseline R50 model trained on the whole upstream dataset $D_U$. The second step of upstream training can include training each expert individually on different subsets of the upstream dataset. Let $D_e :=$ $(X_e, Y_e) \subset D_U$ be the data corresponding to expert e. The subsets corresponding to different experts may overlap (e.g. for the animal and dog experts).

As mentioned before, the full experts can in some implementations completely fine-tune B on $D_e$. For the adapter experts the weights corresponding to the adapter e can in some implementations be trained on $D_e$, but the shared blocks and head parameters can be frozen. Note that, due to the sharing scheme, example implementations of the present disclosure can train all experts independently in parallel. Example implementations of the present disclosure train all experts for the same number of steps, regardless of the size of $D_e$. Instead of learning a routing function, example implementations of the present disclosure exploit the structure of the upstream labels and use a hard-coded routing.

Example Techniques for Expert Selection

Given a new downstream dataset $D_T = (X_T, Y_T)$, example implementations of the present disclosure choose an expert to use. Example implementations of the present disclosure can take one or more (e.g., alone or in combination) of the following three approaches: domain prediction, label matching, and performance proxy.

Domain Prediction. This strategy selects the expert solely based on the images $X_T$. It effectively selects the expert whose domain best matches the target images. Example implementations of the present disclosure implement this by training an auxiliary network (the "Expert Prediction Network" or EPN) to classify the expert from the image (i.e. learn the hard-coded routing mentioned previously). The EPN can in some implementations be trained upstream using the pre-training data and expert assignments. During transfer, an expert can in some implementations be selected using the highest geometric mean EPN predictive probability across the dataset.

Label Matching. Alternatively, matching of the expert to the task can be done in the label space as opposed to the input space. Example implementations of the present disclosure implement this strategy by computing the affinity of each expert to a new downstream task in the label space of the upstream dataset. Example implementations of the present disclosure first use a generic network trained on all upstream labels to predict upstream labels on the downstream images. Example implementations of the present disclosure compute the KL-divergence between the distribution of labels on the downstream task images, and the prior distribution of labels for each expert. This per-expert prior is computed as the empirical distribution of labels on the images used to train that expert. Example implementations of the present disclosure select the expert with the smallest KL-divergence.

Performance Proxy. The aforementioned two strategies do not necessarily use the training labels $Y_T$ available for downstream tasks, which may contain key information. It would be too expensive to fine-tune every expert to every new task and select the best with hindsight, so example implementations of the present disclosure leverage a proxy for the final performance. For this, Example implementations of the present disclosure use a k-nearest neighbors classifier with the image embeddings produced by each expert. In the case of full experts, example implementations of the present disclosure simply apply the corresponding full network to compute these embeddings. For adapter-based experts, example implementations of the present disclosure apply the specific expert and ignore the remaining ones. Concretely, let $M_e(x)$ be the embedding corresponding to expert e on input x, and let $$D_T = \left\{ (x_i, y_i)_{i=1}^{N_T} \right\}$$

be the downstream task. In order to score each expert, example implementations of the present disclosure can apply a kNN classifier on the embedded dataset $$D_{T,e} = \left\{ (M_e(x_i), y_i)_{i=1}^{N_T} \right\},$$

with k=1 and Euclidean distance. The accuracy $acc(D_{T,e})$ is computed via leave-one-out cross-validation. Finally, example implementations of the present disclosure can select the expert with highest accuracy: $e^* = \operatorname{argmax}_e acc(D_{T,e})$. There are other alternative proxies that are cheaper than full fine-tuning, for example fitting a logistic regression, SVM, or decision trees to the features. These proxies may better match final performance. However, kNN is computationally cheap—it only requires a forward pass through the data, and leave-one-out cross-validation requires no additional inference per-fold—and it performs well.

Example Techniques for Downstream Transfer

The expert selection algorithm could choose several experts to be combined to solve any target task. However, example implementations of the present disclosure can also include transferring a single expert per task, since this approach turns out to be effective. Thus, the downstream transfer procedure in this case is straightforward: it simply involves fine-tuning the selected expert model. Example implementations of the present disclosure can fine-tune the entire expert network to the downstream dataset, including the adapters when applicable. This differs from the original residual adapters work, where only the adapters were fine-tuned. While it is valuable to restrict the scope of upstream training to focus on specializing the expert adapter parameters, fine-tuning the whole network downstream is also greatly beneficial.

Example Devices and Systems

Figure 3A:
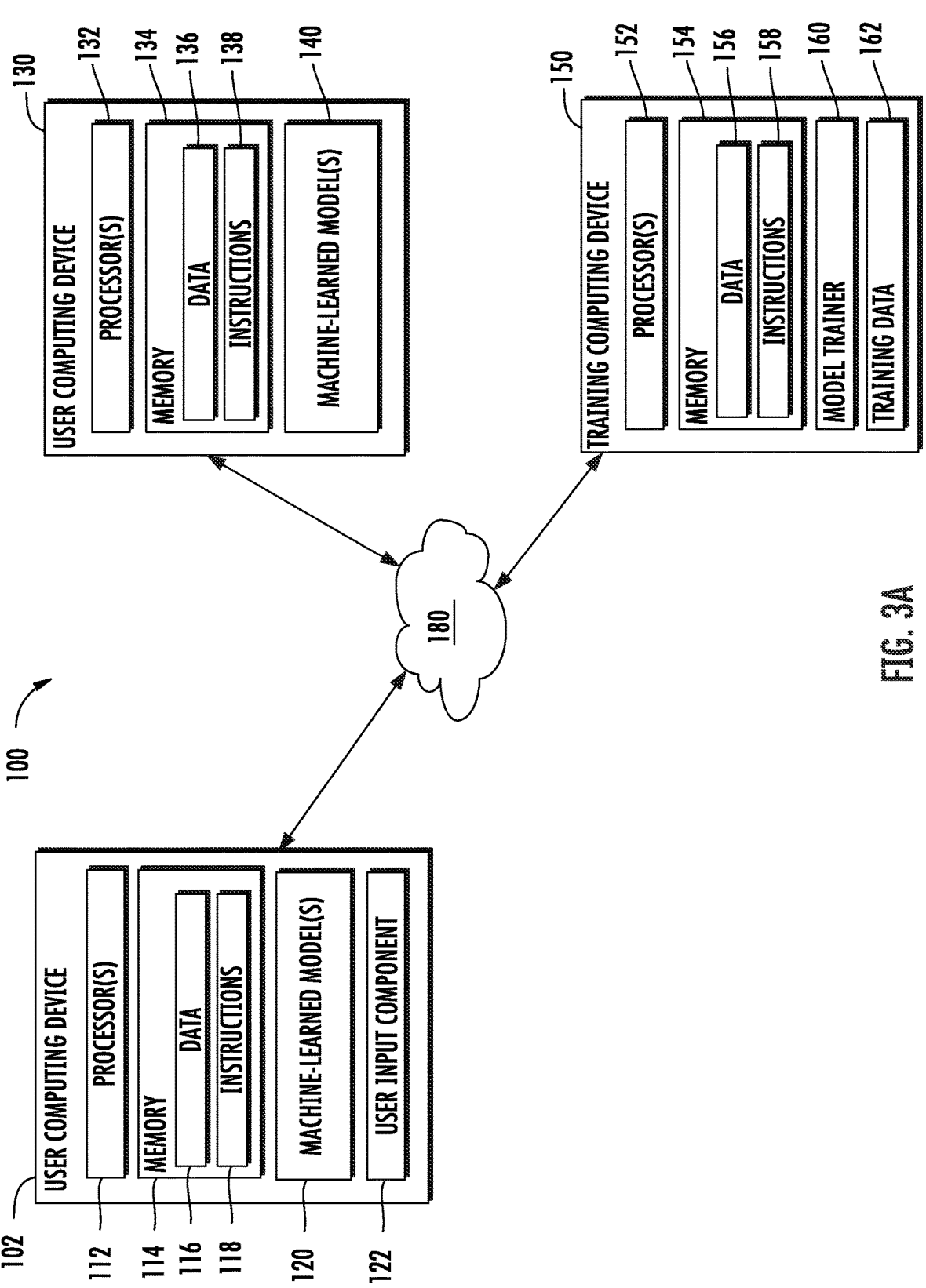
FIG. 3A depicts a block diagram of an example computing system according to example embodiments of the present disclosure.

FIG. 3A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned models 120 are discussed with reference to FIGS. 1-2B.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120.

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service. Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 1-2B.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a training dataset 162. In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 3A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 3B:
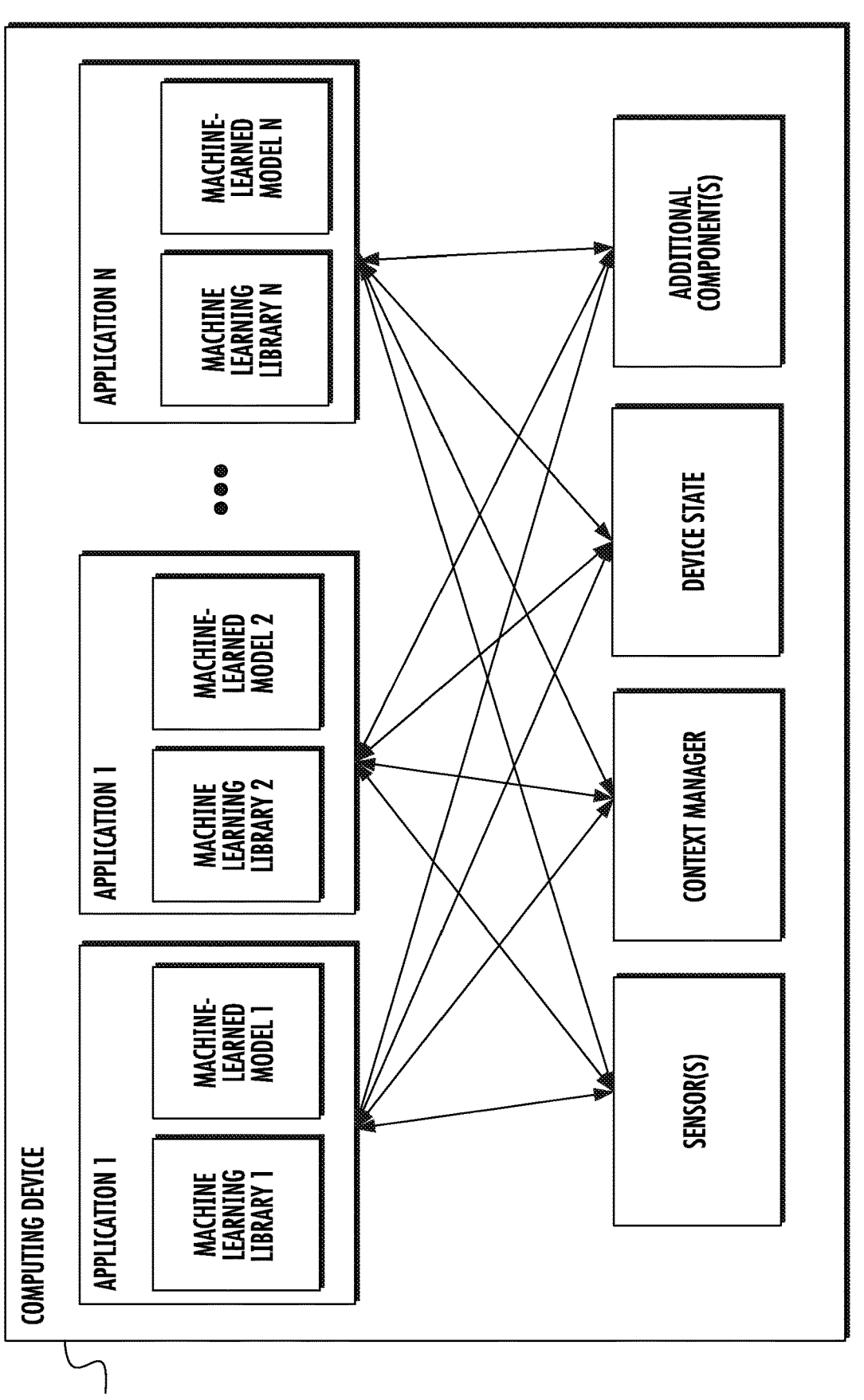
FIG. 3B depicts a block diagram of an example computing device according to example embodiments of the present disclosure.

FIG. 3B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 3B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 3C:
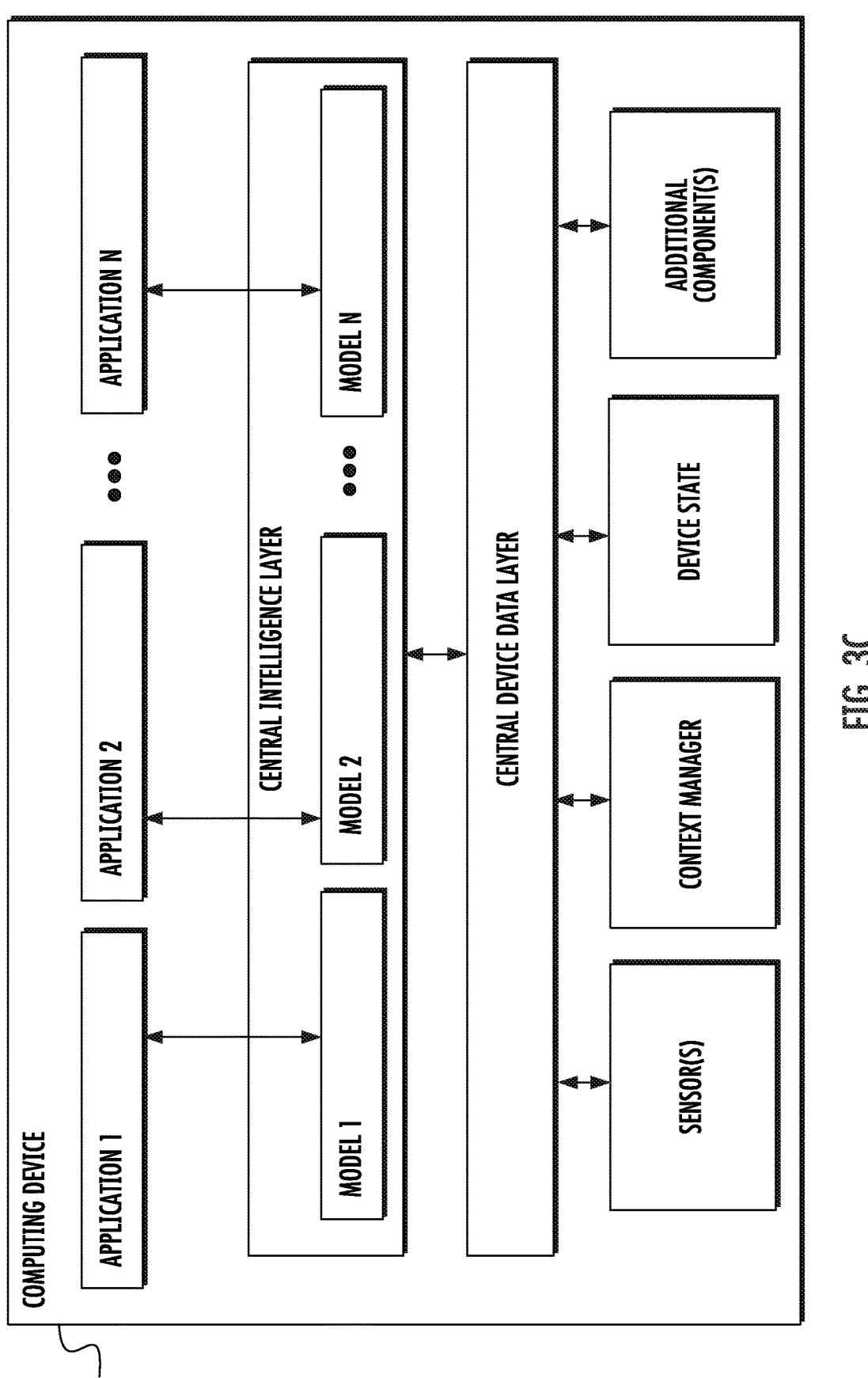
FIG. 3C depicts a block diagram of an example computing device according to example embodiments of the present disclosure.

FIG. 3C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 3C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 3C, the central device data layer can communicate with a number of other components of the computing device, such as, for example, one or more sensors, a context manager, a device state component, and/or additional components. In some implementations, the central device data layer can communicate with each device component using an API (e.g., a private API).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to perform transfer learning from expert models, the method comprising:

accessing, by a computing system one or more computing devices, a plurality of expert machine-learned models, wherein the plurality of expert machine-learned models have been respectively trained on a plurality of different training datasets, the plurality of expert machine-learned models respectively generated by addition of one or more respective expert adapter submodels to one or more existing layers of a baseline machine-learned model that was trained on a base training dataset;

obtaining, by the computing system, data descriptive of a downstream task associated with a downstream training dataset;

evaluating, by the computing system, a respective performance metric for each of the plurality of expert machine-learned models relative to the downstream task;

selecting, by the computing system, one or more of the plurality of expert machine-learned models to serve as one or more selected machine-learned models based at least in part on the respective performance metrics for the plurality of expert machine-learned models;

fine-tuning, by the computing system, the one or more selected machine-learned models using the downstream training dataset; and after fine-tuning the one or more selected machine-learned models, providing, by the computing system, the one or more selected machine-learned models for performance of the downstream task.

2. The computer-implemented method of claim 1, wherein the plurality of different training datasets on which the plurality of expert machine-learned models have been respectively trained comprise a plurality of different sub-portions of the base training dataset.

3. The computer-implemented method of claim 2, wherein training labels in the base training dataset are organized according to a hierarchy, and wherein the plurality of different subportions of the base training dataset comprise a plurality of different hierarchically-defined divisions of the base training dataset.

4. The computer-implemented method of claim 1, wherein the plurality of expert machine-learned models are respectively generated by fully fine- tuning the baseline machine-learned model.

5. The computer-implemented method of claim 1, wherein each expert machine-learned model comprises one or more residual skip connections respectively around the one or more expert adapter submodels.

6. The computer-implemented method of claim 1, wherein, during training of each expert machine-learned model on its respective training dataset, the one or more respective expert adapter submodels are learned while the one or more existing layers of the baseline machine-learned model are held fixed.

7. The computer-implemented method of claim 1, wherein, during fine-tuning of the one or more selected machine-learned models using the downstream training dataset, both the one or more respective expert adapter submodels and the one or more existing layers of the baseline machine-learned model are learned.

8. The computer-implemented method of claim 1, wherein selecting, by the computing system, one or more of the plurality of expert machine-learned models to serve as one or more selected machine-learned models based at least in part on the respective performance metrics for the plurality of expert machine-learned models comprises employing, by the computing system, an expert prediction network to select the one or more selected machine-learned models from the plurality of expert machine-learned models based on one or more training inputs included in the downstream training dataset.

9. The computer-implemented method of claim 1, wherein selecting, by the computing system, one or more of the plurality of expert machine-learned models to serve as one or more selected machine-learned models based at least in part on the respective performance metrics for the plurality of expert machine-learned models comprises:

using, by the computing system, a generic network to predict labels for one or more training examples included in the downstream training dataset;

evaluating, by the computing system, a respective KL-divergence between a distribution of the labels generated by the generic network and a per-expert prior on labels generated by each expert machine-learned model during training of such expert machine-learned model; and selecting, by the computing system, the one or more of the plurality of expert machine-learned models to serve as the one or more selected machine-learned models based at least in part on the respective KL-divergence for each of the plurality of expert machine-learned models.

10. The computer-implemented method of claim 1, wherein selecting, by the computing system, one or more of the plurality of expert machine-learned models to serve as one or more selected machine-learned models based at least in part on the respective performance metrics for the plurality of expert machine-learned models comprises:

using, by the computing system, each expert machine-learned model to produce a respective input embedding for a training input included in the downstream training dataset;

evaluating, by the computing system, a performance proxy for each expert machine-learned model based on application of nearest neighbors to the respective input embedding; and selecting, by the computing system, the one or more of the plurality of expert machine-learned models to serve as the one or more selected machine-learned models based at least in part on the respective performance proxy for each of the plurality of expert machine-learned models.

11. The computer-implemented method of claim 1, wherein accessing, by the computing system, the plurality of expert machine-learned models comprises generating and training, by the computing system, the plurality of expert machine-learned models.

12. The computer-implemented method of claim 1, wherein the downstream task comprises an image recognition task.

13. A computing system, comprising:

one or more processors; and one or more non-transitory computer-readable media that store instructions that, when executed by the one or more processors, cause the computing system to perform operations, the operations comprising:

accessing, by the computing system, a plurality of expert machine-learned models, wherein the plurality of expert machine-learned models have been respectively trained on a plurality of different training datasets, the plurality of expert machine-learned models respectively generated by addition of one or more respective expert adapter submodels to one or more existing layers of a baseline machine-learned model that was trained on a base training dataset;

obtaining, by the computing system, data descriptive of a downstream task associated with a downstream training dataset;

evaluating, by the computing system, a respective performance metric for each of the plurality of expert machine-learned models relative to the downstream task;

selecting, by the computing system, one or more of the plurality of expert machine-learned models to serve as one or more selected machine-learned models based at least in part on the respective performance metrics for the plurality of expert machine-learned models;

fine-tuning, by the computing system, the one or more selected machine-learned models using the downstream training dataset; and after fine-tuning the one or more selected machine-learned models, providing, by the computing system, the one or more selected machine-learned models for performance of the downstream task.

14. The computing system of claim 13, wherein the plurality of different training datasets on which the plurality of expert machine-learned models have been respectively trained comprise a plurality of different subportions of the base training dataset.

15. The computing system of claim 14, wherein training labels in the base training dataset are organized according to a hierarchy, and wherein the plurality of different subportions of the base training dataset comprise a plurality of different hierarchically-defined divisions of the base training dataset.

16. One or more non-transitory computer-readable media that store a downstream machine-learned model generated through performance of operations, the operations comprising:

accessing, by a computing system, a plurality of expert machine-learned models, wherein the plurality of expert machine-learned models have been respectively trained on a plurality of different training datasets, the plurality of expert machine-learned models respectively generated by addition of one or more respective expert adapter submodels to one or more existing layers of a baseline machine-learned model that was trained on a base training dataset;

obtaining, by the computing system, data descriptive of a downstream task associated with a downstream training dataset;

evaluating, by the computing system, a respective performance metric for each of the plurality of expert machine-learned models relative to the downstream task;

selecting, by the computing system, one or more of the plurality of expert machine-learned models to serve as one or more selected machine-learned models based at least in part on the respective performance metrics for the plurality of expert machine-learned models;

fine-tuning, by the computing system, the one or more selected machine-learned models using the downstream training dataset; and after fine-tuning the one or more selected machine-learned models, providing, by the computing system, the one or more selected machine-learned models as the downstream machine-learned model for performance of the downstream task.

17. The one or more non-transitory computer-readable media of claim 16, wherein:

the plurality of different training datasets on which the plurality of expert machine-learned models have been respectively trained comprise a plurality of different subportions of the base training dataset;

training labels in the base training dataset are organized according to a hierarchy; and the plurality of different subportions of the base training dataset comprise a plurality of different hierarchically-defined divisions of the base training dataset.

18. The computing system of claim 13, wherein each expert machine-learned model comprises one or more residual skip connections respectively around the one or more respective expert adapter submodels.

19. The one or more non-transitory computer-readable media of claim 16, wherein during training of each expert machine-learned model on its respective training dataset, the one or more respective expert adapter submodels are learned while the one or more existing layers of the baseline machine-learned model are held fixed.

20. The one or more non-transitory computer-readable media of claim 16, wherein, during fine-tuning of the one or more selected machine-learned models using the downstream training dataset, both the one or more respective expert adapter submodels and the one or more existing layers of the baseline machine-learned model are learned.

* * * * *